C. E. STEERE.
LIQUID MEASURING DEVICE.
APPLICATION FILED AUG. 9, 1915.

1,298,814.

Patented Apr. 1, 1919.
4 SHEETS—SHEET 1.

Witnesses:

Inventor:
Clarence E. Steere

C. E. STEERE.
LIQUID MEASURING DEVICE.
APPLICATION FILED AUG. 9, 1915.
1,298,814.
Patented Apr. 1, 1919.
2 SHEETS—SHEET 2.
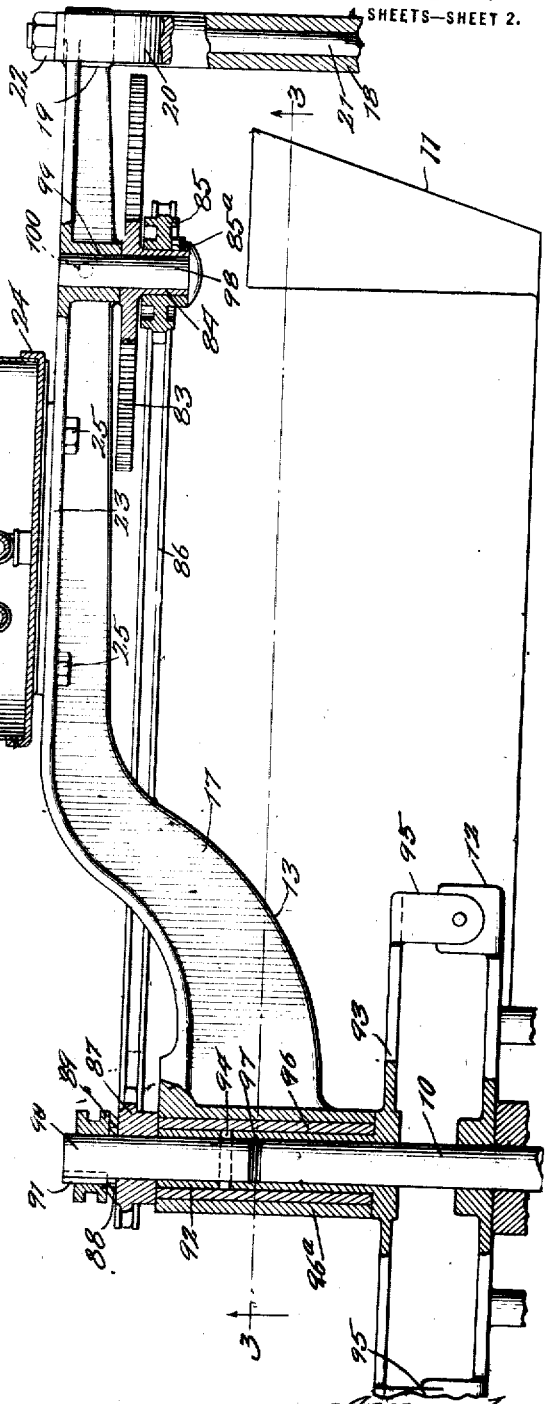
Inventor.
Clarence E. Steere
By Jones, Addington, Ames & Seibold
Attys
Witnesses:

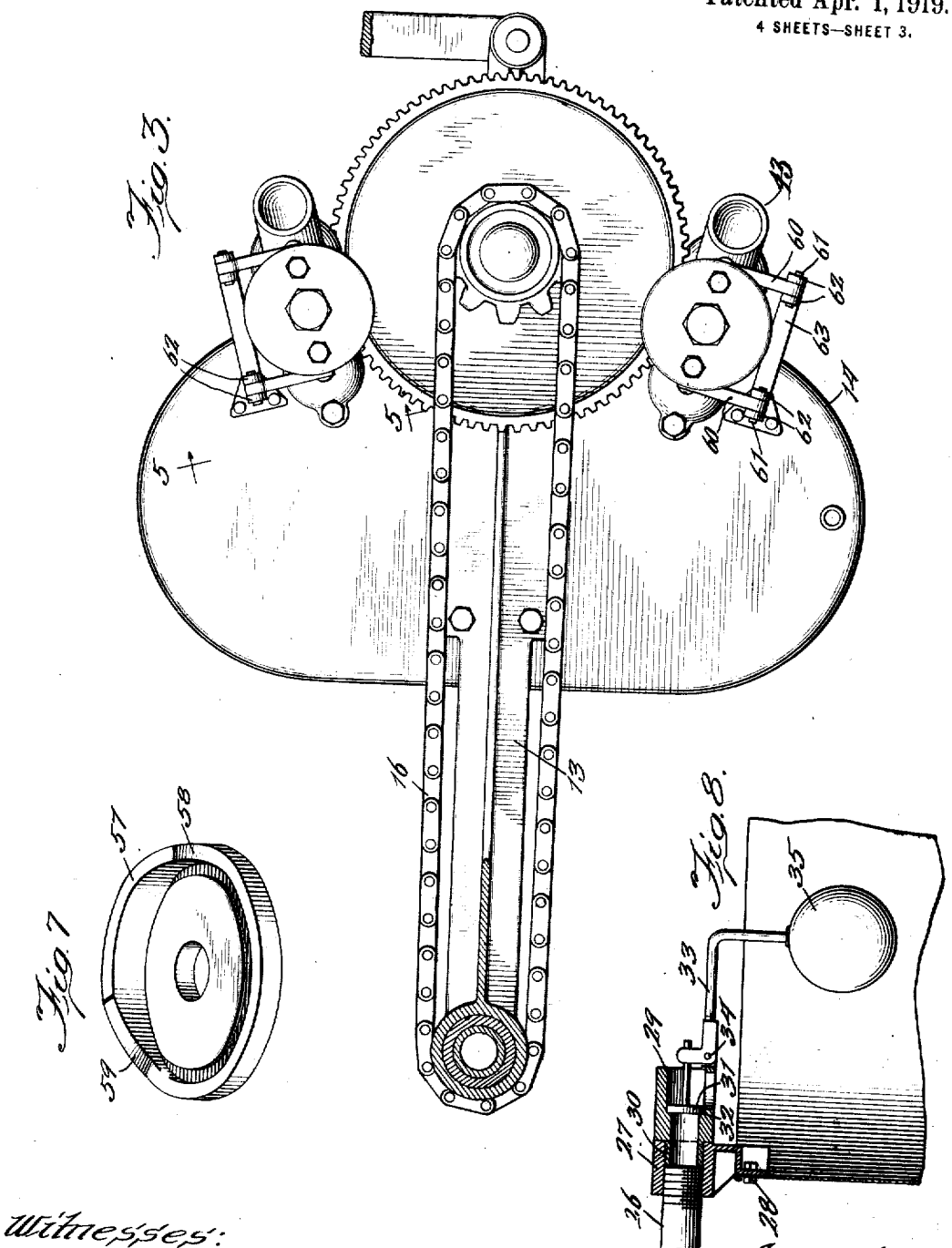

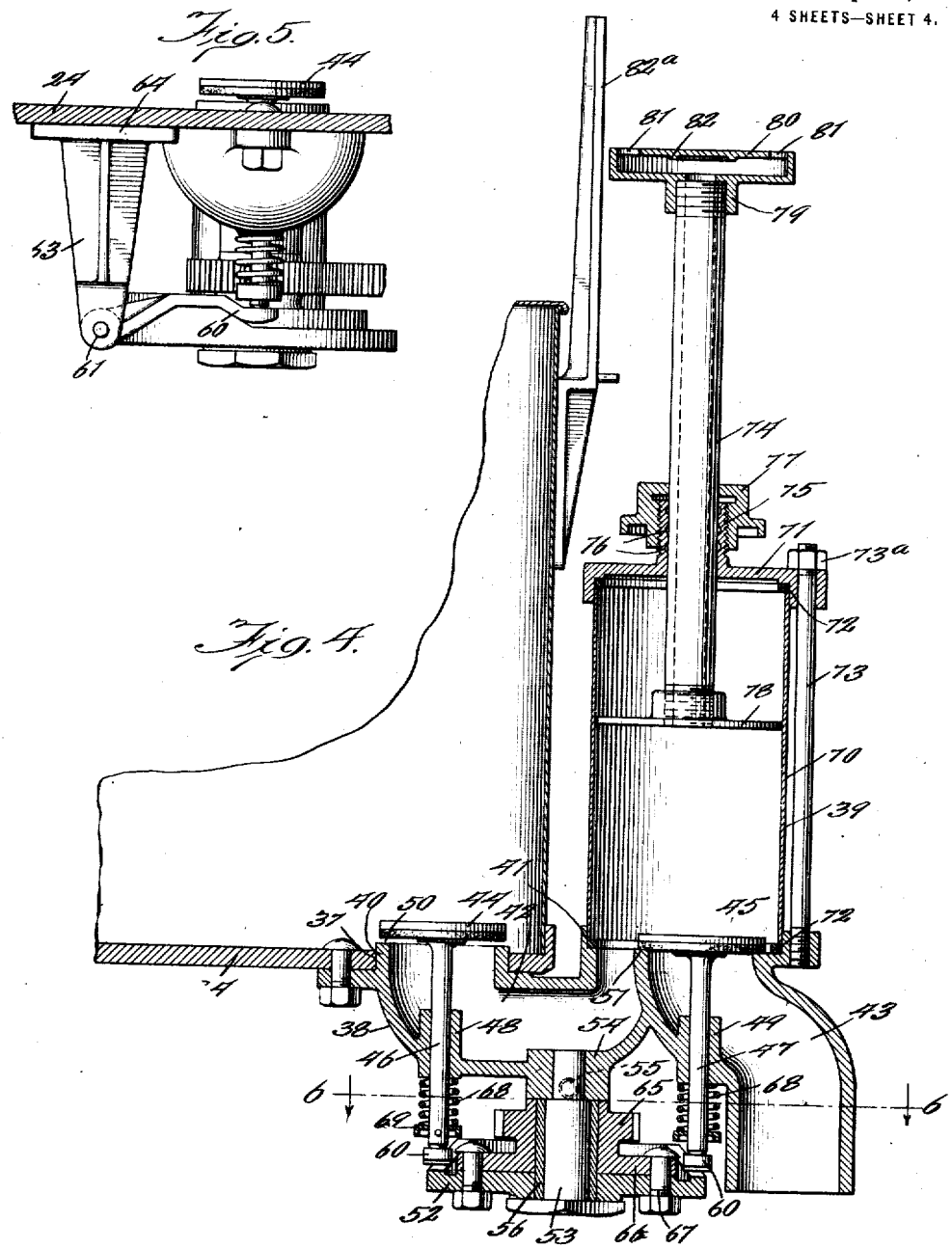

UNITED STATES PATENT OFFICE.

CLARENCE E. STEERE, OF CHICAGO, ILLINOIS, ASSIGNOR TO SPRAGUE CANNING MACHINERY COMPANY, OF CHICAGO, ILLINOIS, A CORPORATION OF ILLINOIS.

LIQUID-MEASURING DEVICE.

1,298,814.   Specification of Letters Patent.   Patented Apr. 1, 1919.

Application filed August 9, 1915. Serial No. 44,595.

*To all whom it may concern:*

Be it known that I, CLARENCE E. STEERE, a citizen of the United States, residing at Chicago, in the county of Cook and State of Illinois, have invented new and useful Improvements in Liquid-Measuring Devices, of which the following is a full, clear, concise, and exact description, reference being had to the accompanying drawing, forming a part of this specification.

My invention relates to liquid measuring devices and more specifically to devices of this character used in connection with canning machinery.

One of the objects of my invention is to provide an improved device for delivering a measured quantity of liquid which shall be simple in construction and efficient in operation, and which will not waste the liquid, which will deliver accurate measured amounts and in which the measured amount delivered can be varied.

Further objects will appear from the description to follow taken in connection with the appended claims.

In the drawings, in which I have illustrated one embodiment of my invention—

Fig. 2 is a vertical section substantially on the line 2—2 of Fig. 1, showing the manner in which the reservoir is supported on the can filling machine, and showing the drive mechanism for the valves which control the outlets from the reservoir;

Fig. 3 is a horizontal section on the line 3—3 of Fig. 2 looking in the direction of the arrows, showing the bottom of the reservoir and the outlet fittings in place thereon, and showing the drive mechanism for the valves which control the outlets;

Fig. 4 is a vertical section on the line 4—4 of Fig. 1 showing the manner in which the outlet fitting and measuring chamber are mounted with respect to the reservoir, and showing the valve mechanism controlling the inlet to and outlet from the measuring chamber;

Fig. 5 is a vertical section on the line 5—5 of Fig. 3 showing the cam mechanism for actuating the inlet and outlet valves;

Fig. 6 is a horizontal section on the line 6—6 of Fig. 4 showing in plan view the cam which actuates the valve;

Fig. 7 is a perspective view of the valve actuating cam; and

Fig. 8 is a vertical section on the line 8—8 of Fig. 2, showing the float valve mechanism controlling the level of the liquid in the reservoir.

Figure 1:
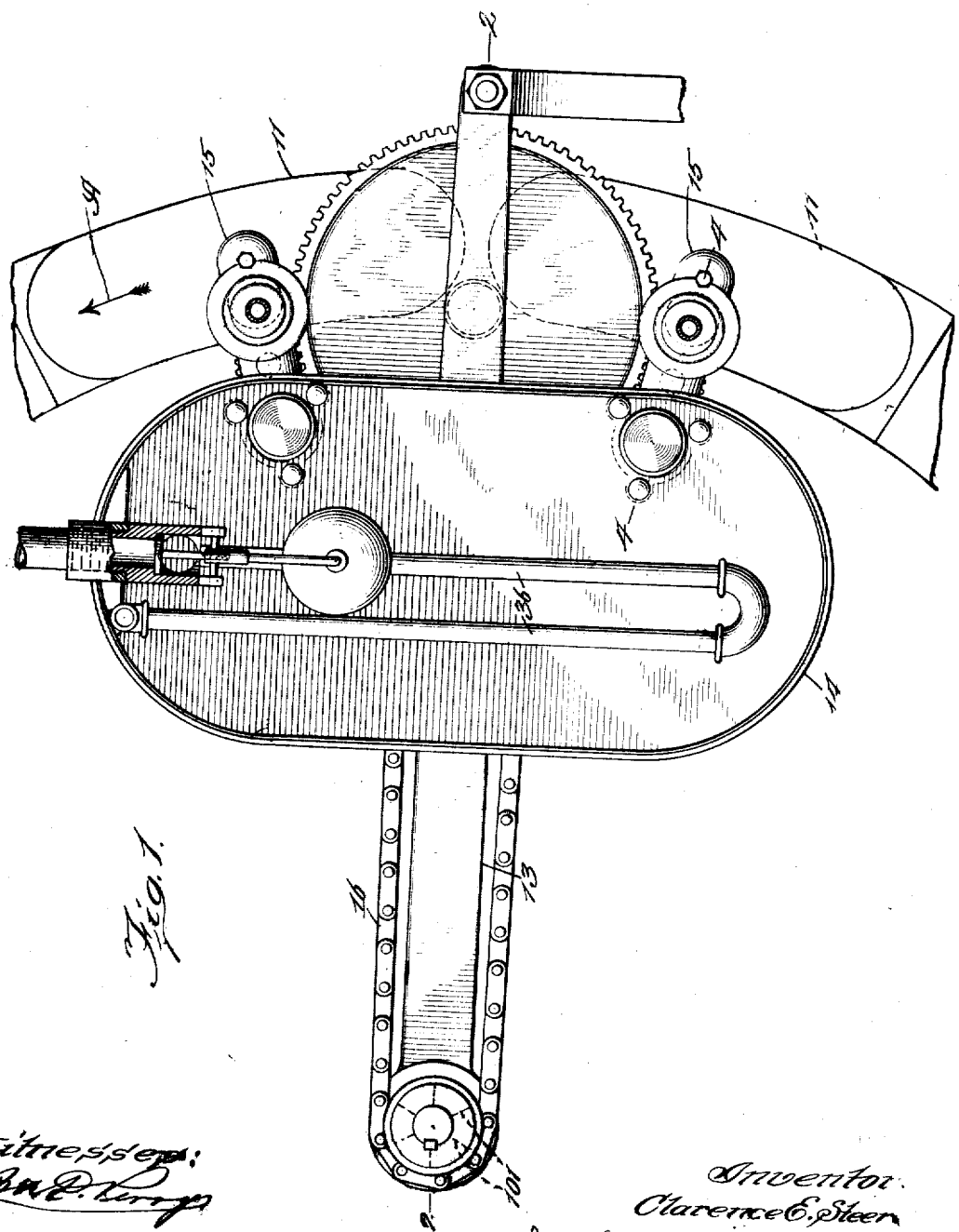
Figure 1 is a plan view showing my improved measuring device in connection with a can filling machine showing the liquid reservoir, the discharge outlets therefrom, and showing in dotted lines the funnels which pass beneath the outlets.

Referring now to the drawing in detail, I have shown my improved measuring device in connection with a filling machine having a central vertical shaft 10 around which the filling funnels or receivers 11, indicated in dotted lines in Fig. 1, are mounted to rotate, together with the member 12 which is utilized to drive the valve controlling mechanism of the measuring device, a supporting structure 13, a reservoir 14 mounted on the structure 13, a measuring device 38 and drive mechanism 16 for controlling the measuring device. The supporting structure 13 comprises a bracket 17, the inner end of which surrounds the shaft 10, a tubular support 18 on which the outer end 19 of the bracket 17 rests, a brace bar 20 resting on the top of the part 19, a rod 21 extending through the tubular support 18 and openings in the part 19 and bar 20, and a nut 22 threaded in the upper end of the rod 21.

The tubular support 18, bar 20 and rod 21 are secured to any suitable parts of the filling machine (not shown). The bracket 17 has a base portion 23 to which the bottom plate 24 of the reservoir 14 is secured by means of bolts 25. The reservoir 14 is supplied with liquid from a supply pipe 26 which is screwed into a fitting 27 secured to the side walls of the reservoir 14 by means of bolts 28. A float valve 29 is screwed into the fitting 27 as shown at 30. This float valve comprises a valve head 31 coöperating with the valve seat 32, the valve head 31 being connected to a float lever 33 which is pivotally mounted at 34, and has a float 35 secured at its outer end. The reservoir 14 may be provided with a steam coil 36 for heating the liquid. The bottom plate 24 has two openings 37 therein in which the measuring devices 38 are secured. As these measuring devices 38 are similar in construction a description of one will suffice for both. Each measuring device 38 comprises a measuring chamber 39, an annular flange 40 fitting within the opening 37, an annular flange 41 within which the measuring chamber 39 fits, a passage 42 affording communication between the reservoir 14 and the measuring chamber 39, an outlet passage 43 from the measuring chamber 39, and inlet and outlet valves 44 and 45, respectively, provided with valve stems 46 and 47, respectively, slidable in sleeves 48 and 49. The valves 44 and 45 coöperate with valve seats 50 and 51 respectively to control the flow of liquid to and from the measuring chamber 39. The valves 44 and 45 are operated by means of a cam 52 rotatably mounted on a stud 53 which is secured within a sleeve 54 on the measuring device 38 by means of a set screw 55 (Fig. 4). A bushing 56 is provided between the cam 52 and stud 53. The cam 52 has an upstanding arcuate flange 57 having inclined portions 58 and 59 for engagement with wear-resisting arms 60 pivotally mounted at 61 between lugs 62 on the bracket 63, the base 64 of which is secured to the bottom plate of the reservoir, (Fig. 5). The cam 52 is driven from a spur gear 65 which has formed integral therewith a flange 66 which is secured to the cam 52 by means of bolts 67. The valves 44 and 45 are normally held in closed position by means of springs 68 which engage washers 69 secured to the valve stems 46 and 47. The measuring chamber 39 comprises a cylindrical portion 70 and a head 71 secured thereon, packing rings 72 being provided at the top and bottom of the cylindrical portion 70 to afford a liquid tight connection. The measuring chamber 39 and the head 71 are held in place by means of rods 73 screwed into the flange portion 41 and provided with nuts 73ª above the head 71. A tubular air vent 74 extends through a sleeve 75 on the head 71, the sleeve 75 being provided with integral annular grooves 76 to form a water packing between the sleeve 75 and tube 74. A stuffing box cap 77 may be screw threaded onto the sleeve 75 if desired to assist in making a liquid tight connection and also to frictionally hold the tube 74 in adjusted position. A baffle plate 78 is screw threaded onto the lower end of the tube 74. This baffle plate extends in proximity to the cylindrical portion 70 of the measuring device but does not contact therewith. A handle 79 is screw threaded onto the upper end of the tube 74, the handle being hollow and communicating with the interior of the tube 74 and provided with a transversely extending baffle plate 80, openings 81 being provided in the baffle plate 80 to permit the escape of air. The baffle plate 80 is provided with an annular downwardly extending lip 82, the purpose of which is to deflect any liquid which may rush out through the tube 74 downwardly to prevent its escaping through the openings 81. A gage 82ª is secured to the side of the reservoir 14 adjacent the handle 79, the rim of the handle 79 coöperating with the markings on the gage as an indicator. The gears 65 both mesh with a large gear 83 which is provided with a downwardly extending hub portion 84 on which a sprocket 85 is secured by means of a set screw 85ª, as shown in Fig. 2. The sprocket 85 is driven by a sprocket chain 86 which in turn is driven from a sprocket 87 having a clutch portion 88 formed integral therewith for engagement with a corresponding clutch portion 89 slidably mounted on the extension shaft 90, a key 91 being provided to prevent relative rotation between the clutch portion 89 and the extension shaft 90. The extension shaft 90 is secured to a sleeve portion 92 of the driving cross-head 93 by means of a pin 94. The driving cross-head 93 has downwardly extending lugs 95 for engagement with the driving member 12 which, as previously stated, rotates around the central shaft 10 of the filling machine. The lugs 95 are engaged by the driving member 12, so that when the driving member 12 rotates the driving cross-head 93 will rotate along with it. The extension shaft 90 is connected to the sleeve portion 92 of the cross-head 93 by means of the pin 94, so that the extension shaft 90 also revolves with the driving member 12. The clutch portion 89 is slidably but non-rotatably mounted with respect to the shaft 90 by means of the key 91, whereby the clutch portion 89 may be moved vertically into or out of engagement with the clutch portion 88 on the sprocket 87. Thus, when the clutch portion 89 is moved into engagement with the clutch portion 88, the sprocket 87 also will rotate with the driving member 12, but when the clutch portion 89 is lifted out of engagement with the clutch portion 88 the extension shaft 90 will rotate without causing rotation of the sprocket 87. A bushing 96 is provided between the sleeve portion 92 of the cross-head 93 and the sleeve portion 96ª of the bracket 17.

Bearing washers 97 are provided between the central shaft 10 and the extension shaft 90. The spur gear 83 is mounted on a pin 98 which is secured in an opening 99 in the bracket 17 by means of a set screw 100. The clutch portions 88 and 89 are provided with teeth 101 the number of which is just half the number of the funnels 11 of the filling machine, the relation between the clutch teeth 101, the driving mechanism 16 and the funnels 11 being such that when the teeth of the clutch come into driving engagement the outlet valves will be operated to cause the discharge from the measuring chamber to be properly timed with respect to the passage of the funnels 11 beneath the outlets.

Because of the fact that the number of the funnels 11 is a multiple of the number of teeth 101, the operation of the valves will always be properly timed in respect to the passage of the funnels.

It follows from this construction that no matter in which one of the six possible positions the clutch members 88 and 89 engage each other, the operation of the valves will be properly timed with respect to the passage of the funnels.

The operation of my improved device is as follows. The reservoir 14 is supplied with the liquid which is to be delivered to the funnels 11 through the supply pipe 26, the level of the liquid in the reservoir 14 being maintained substantially constant by means of a float valve 29. When the clutch portions 88 and 89 are moved to driving engagement the cam 52 which controls the operation of the valves 44 and 45 is caused to rotate by means of the driving cross-head 93 through the intermediate driving mechanism including the clutch portions 89 and 88, the sprocket 87, spur gear 83 and spur gears 65. The flange 57 of the cam 52 is so proportioned that one of the valves 44 and 45 will be closed when the other is open and vice versa. Assuming that the cam 52 is in a position in which the valve 45 is closed and the valve 44 opened the liquid will flow from the reservoir 14 past the valve 44, through the passage 42 into the measuring chamber 39; liquid will rise in this measuring chamber until it reaches the lower edge of the vent tube 74 and will then rise up into the vent tube until the level of the liquid in the vent tube is the same as the level of the liquid in the reservoir 14.

In practice it has been found that, due to the rush of the liquid in the measuring chamber 39 and up into the tube 74, the liquid in the tube will at first rise considerably above the level of the liquid in the reservoir and will oscillate back and forth until it comes to rest at the level of the liquid in the reservoir. To prevent the liquid rushing out the tube 74 from escaping at the top of the tube the handle 79 is provided with the baffle plate 80 and with the downwardly extending annular lip 82 which will obstruct the flow of the liquid and direct it downward to cause it to be drained back again into the tube 74. The air in the measuring chamber 39 above the lower end of the air vent 74 is trapped within the chamber as soon as the level of the liquid therein rises to the lower end of the vent tube so that no more air can escape from the measuring chamber. The lower end of the vent tube 74 is provided with a baffle plate 78 the purpose of which is to insure accuracy of the measuring device, as in practice it has been found that without this baffle plate the upper surface of the liquid as it rises in the measuring chamber 39 was in a disturbed condition so that the amount of air trapped in the measuring chamber was not uniform.

With the use of the baffle plate, however, the upper surface of the liquid as it rises in the measuring chamber is smoothed out as it comes in contact with the baffle plate insuring a uniform cutoff of the air in the measuring chamber above the lower end of the vent tube 74. A slight space is left between the outer edge of the baffle plate 78 and the inner surface of the cylindrical portion 70 to prevent sticking of the baffle plate, and also to prevent corrosion.

After the measuring chamber 70 has been filled up to the lower end of the vent tube 74 the cam 52 operates to permit the valve 44 to close and to open the valve 45 to permit the liquid in the measuring chamber 39 to be discharged through the outlet nozzle 43 into the funnel 11 which is passing thereunder.

The distance between the outlets of the two measuring devices on the reservoir corresponds to the distance between corresponding parts of the adjacent funnels 11 so that two adjacent funnels 11 are both filled at the same time from the two measuring devices. With this arrangement of measuring devices and funnels each measuring device discharges into alternate funnels; that is, one measuring device will discharge into the first, third and fifth funnels, while the other measuring device will discharge into the second, fourth and sixth, etc. The wear resisting members 60 are provided between the cam 52 and the lower ends of the valve stems 46 and 47 to prevent side pull on the valve stems and also to prevent wear.

Having thus described my invention what I claim as new and desire to secure by Letters Patent is:—

1. The combination with a reservoir having an opening in its bottom, and a container outside of said reservoir having an opening in its bottom, of a fitting comprising a conduit connecting said openings, a conduit leading from said container, valve means controlling both of said conduits supported by said fitting, and means for actuating said valve means also supported by said fitting, said valve means being vertically movable and said actuating means including a cam rotatable about a vertical axis.

2. The combination with a reservoir having an opening in its bottom, and a container outside of said reservoir having an opening in its bottom, of a fitting comprising a conduit connecting said openings, a conduit leading from said container, valve means controlling one of said conduits supported by said fitting, said valve means including a stem slidably mounted in said fitting, cam means for actuating said stem, and a pivoted wear-resisting member interposed between said cam and stem.

3. In a device of the character described, a reservoir having an outlet, a valve controlling said outlet, a series of evenly spaced receivers mounted in circular arrangement to rotate about an axis and to move in succession beneath said outlet, and driving means for said valve, and a toothed clutch member interposed in said driving means, the number of said receivers being equal to or a multiple of the number of teeth on said clutch member.

4. The combination with a machine having a vertical shaft, and a series of receivers mounted to revolve about said shaft as an axis, of a liquid reservoir having a discharge outlet beneath which said receivers pass as they revolve, a valve controlling said outlet, and means for operating said valve comprising a wheel rotatable about the axis of said shaft.

5. The combination with a machine having a vertical shaft, and a series of receivers mounted to revolve about said shaft as an axis, of a liquid reservoir having a discharge outlet beneath which said receivers pass as they revolve, means for supporting said reservoir comprising a bracket having a sleeve coaxial with said shaft, a valve controlling said outlet, and means for operating said valve comprising a wheel rotatable about the axis of said shaft.

6. The combination with a machine having a vertical shaft, and a series of receivers mounted to revolve about said shaft as an axis, of a liquid reservoir having a discharge outlet beneath which said receivers pass as they revolve, means for supporting said reservoir comprising a bracket having a sleeve coaxial with said shaft, a valve controlling said outlet means for operating said valve comprising a wheel rotatable about the axis of said shaft, and a wheel rotatably supported by said bracket and driven from said first wheel.

7. In a device of the class described, reservoir means having two spaced outlets, two valves, one controlling each outlet, a series of evenly spaced receivers mounted in circular arrangement to rotate about an axis and to move beneath said outlets, the spacing of the outlets corresponding to the spacing of the receivers, and automatic means for operating said valves so that one receiver will be supplied from one outlet and the succeeding receiver supplied from the other outlet, said automatic means comprising a cam for each valve, a gear for each cam, and a single gear meshing with both said first gears.

8. The combination with a machine having a vertical shaft, and a series of receivers mounted to revolve about said shaft as an axis, of a liquid reservoir having a discharge outlet beneath which said receivers pass as they revolve, means for supporting said reservoir comprising a bracket having a sleeve coaxial with said shaft, a valve controlling said outlet, and means for operating said valve comprising a sprocket wheel rotatable about the axis of said shaft, a sprocket wheel supported by said bracket, and a chain connecting said sprocket wheels.

9. The combination with a machine having a vertical shaft and a series of receivers mounted to revolve about said shaft as an axis, reservoir means having two spaced outlets beneath which said receivers pass as they revolve, two valves, one for each outlet, and means for operating said valves comprising a cam for each valve, a gear for each cam, a single gear meshing with both said first gears, and means for driving said single gear comprising a wheel rotatable about the axis of said shaft.

10. The combination with a machine having a vertical shaft and a series of receivers mounted to revolve about said shaft as an axis, reservoir means having two spaced outlets beneath which said receivers pass as they revolve, two valves, one for each outlet, and means for operating said valves comprising a cam for each valve, a gear for each cam, a single gear meshing with both said first gears, and means for driving said single gear comprising a sprocket wheel rotatable about the axis of said shaft, a sprocket wheel coaxial with said single gear and a chain connecting said sprockets.

11. A machine for supplying liquid to receivers comprising means for moving a series of receivers in a circular path, a reservoir located within the orbit of said receivers, a container located to one side of said reservoir and substantially above the path of said receivers, a conduit leading from said reservoir to said container for supplying liquid to said container, a conduit leading from said container to a position above the path of said receivers, valve means for controlling said conduits, and means for periodically actuating said valve means to deliver the amount of liquid measured by said container to a receiver.

12. A machine for periodically delivering measured quantities of liquid to receivers, comprising means for moving a series of receivers in a circular path, a reservoir located within the orbit of said receivers, a container located to one side of said reservoir and substantially above the path of said receivers, a conduit leading from said reservoir to said container for delivering liquid to said container, a conduit leading from said container to a position above the path of said receivers, valve mechanism for controlling said conduits, and actuating means located beneath said reservoir for periodically actuating said valve means for delivering the amount of liquid measured by said container to a receiver.

13. A machine for delivering measured quantities of liquid to receivers, comprising means for moving a series of receivers in a circular path, a reservoir located within the orbit of said receivers, a container located to one side of said reservoir substantially above the path of said receivers, a fitting connecting said reservoir and container, said reservoir and container, respectively, having openings in their bottoms, said fitting having a passage leading downwardly from the opening in the reservoir and upwardly into the opening in said container, for supplying liquid from said reservoir to said container, and a passage leading downwardly from the bottom of said container to a position above the path of said receivers, for discharging liquid from said container to a receiver, valve mechanism for controlling said passages, and actuating means for periodically actuating said valve mechanism to deliver the quantity of liquid measured by said container to a receiver.

14. A machine for delivering measured quantities of liquid to receivers, comprising means for moving a series of receivers in a circular path, a reservoir located inside the orbit of said receivers and having an opening in its bottom, a container located to one side of said reservoir and substantially above the path of said receivers and having an opening in its bottom, a fitting connecting said reservoir and container having a passage leading downwardly from the opening in the reservoir and upwardly into the opening in said container for supplying liquid from said reservoir to said container, and a passage leading downwardly from the bottom of said container for discharging liquid to a receiver, valve means for controlling said passages including vertically-acting lift-valve means for controlling the flow through said first passage, and actuating means for periodically operating said valve means for delivering a quantity of liquid measured by said container to a receiver.

15. A machine for delivering measured quantities of liquid to receivers, comprising means for moving a series of receivers in a circular path, a reservoir located within the orbit of said receivers and having an opening in its bottom, a container located to one side of said reservoir substantially above the path of said receivers and having an opening in its bottom, a fitting connecting said reservoir and container having a passage leading downwardly from the opening in the reservoir and upwardly into the opening in said container for supplying liquid to said container, and a passage leading downwardly from the bottom of said container for delivering liquid to a receiver, vertically-acting lift-valve means for controlling the flow through said first passage, other vertically-acting lift-valve means for controlling the flow through said other passage, and actuating mechanism for periodically operating said valve means for delivering a quantity of liquid measured by said container to a receiver.

16. In a device of the class described, a first measuring chamber; an outlet therefor; a second measuring chamber; an outlet therefor; first and second receivers mounted to travel beneath said outlets; means for supplying liquid to said first measuring chamber as said first receiver travels beneath said first outlet; means whereby liquid is supplied from said first measuring chamber through said first outlet to said second receiver as it travels beneath said first outlet; means for supplying liquid to said second measuring chamber as said second receiver travels beneath said second outlet; and means whereby liquid is supplied from said second measuring chamber through said second outlet to said first receiver as it passes beneath said second outlet.

In witness whereof I have hereunto subscribed my name in the presence of two witnesses.

CLARENCE E. STEERE.

Witnesses:
  LELAND A. BABCOCK,
  DANIEL G. FRENCH.